United States Patent
Giraldo et al.

(10) Patent No.: US 11,919,827 B2
(45) Date of Patent: Mar. 5, 2024

(54) SYSTEM AND METHOD FOR PRODUCING AN ORGANIC FERTILIZER FROM WASTE GASES OR LIQUIDS

(71) Applicants: NUORGANICS LLC, Robbinsville, NJ (US); Nicolas Enrique Giraldo-Wingler, Robbinsville, NJ (US)

(72) Inventors: Eugenio Giraldo, Robbinsville, NJ (US); Nicolas Enrique Giraldo-Wingler, Robbinsville, NJ (US)

(73) Assignees: NUORGANICS LLC, Robbinsville, NJ (US); Nicolas Enrique Giraldo-Wingler, Robbinsville, NJ (US)

( * ) Notice: Subject to any disclaimer, the term of this patent is extended or adjusted under 35 U.S.C. 154(b) by 62 days.

(21) Appl. No.: 17/245,264

(22) Filed: Apr. 30, 2021

(65) Prior Publication Data

US 2021/0380495 A1 Dec. 9, 2021

Related U.S. Application Data

(60) Provisional application No. 63/018,385, filed on Apr. 30, 2020.

(51) Int. Cl.
C05C 3/00 (2006.01)
C05F 11/06 (2006.01)
C05G 5/20 (2020.01)

(52) U.S. Cl.
CPC ............ *C05C 3/00* (2013.01); *C05F 11/06* (2013.01); *C05G 5/20* (2020.02)

(58) Field of Classification Search
None
See application file for complete search history.

(56) References Cited

U.S. PATENT DOCUMENTS

| | | | |
|---|---|---|---|
| 2,992,093 A | 7/1961 | Burdick | |
| 3,418,100 A | 12/1968 | Cooley | |
| 3,544,296 A | 12/1970 | Karcher | |
| 3,770,411 A * | 11/1973 | Chambers | ............... C05B 7/00 |
| | | | 71/64.1 |

(Continued)

FOREIGN PATENT DOCUMENTS

| | | | | |
|---|---|---|---|---|
| CN | 106631230 A * | 5/2017 | ............... | C05C 3/00 |
| DE | 2320678 A1 * | 11/1974 | ............... | C05C 3/00 |

(Continued)

*Primary Examiner* — Wayne A Langel
(74) *Attorney, Agent, or Firm* — Lando & Anastasi, LLP

(57) ABSTRACT

Systems and methods for producing an organic fertilizer rich in humic substances and nitrogen from waste gases and liquids are disclosed. The methods include forming a mixture of coal and liquid and contacting said mixture with a gas containing ammonia, allowing ammonia react with the coal to release humic substances to the liquid and to complex ammonia with the coal and humic substances controlling the pH of the mixture and forming a humic ammonia rich fertilizer. The systems include a mixing chamber fluidly connected to sources of liquid and coal, a gas contacting chamber, a pH control subsystem, a solid liquid separator and a pathogen deactivator.

20 Claims, 8 Drawing Sheets

(56) References Cited

U.S. PATENT DOCUMENTS

| | | | | |
|---|---|---|---|---|
| 4,319,041 | A * | 3/1982 | Goff | C08H 99/00 |
| | | | | 562/475 |
| 4,786,307 | A * | 11/1988 | Marihart | C05F 11/02 |
| | | | | 71/11 |
| 4,918,059 | A * | 4/1990 | Seubert | A61P 43/00 |
| | | | | 514/33 |
| 6,695,892 | B1 | 2/2004 | Fischer et al. | |
| 8,580,979 | B1 * | 11/2013 | Shulgin | C05F 11/02 |
| | | | | 423/210 |
| 8,784,665 | B1 * | 7/2014 | McMahon | C02F 3/344 |
| | | | | 210/660 |
| 9,011,577 | B2 | 4/2015 | Walia et al. | |
| 10,981,841 | B1 * | 4/2021 | Shulgin | C05G 5/30 |
| 2015/0052959 | A1 * | 2/2015 | Duoibes | C05F 5/00 |
| | | | | 71/11 |
| 2019/0337863 | A1 * | 11/2019 | Stemwedel | C05F 17/60 |

FOREIGN PATENT DOCUMENTS

| | | | | |
|---|---|---|---|---|
| DK | 178419 B1 | | 2/2016 | |
| GB | 2462640 | * | 2/2010 | F16K 7/17 |
| RU | 2621978 C1 | * | 6/2017 | C05F 11/02 |
| WO | WO 03/014031 A1 | * | 2/2003 | C02F 11/14 |

* cited by examiner

SYSTEM AND METHOD FOR PRODUCING AN ORGANIC FERTILIZER FROM WASTE GASES OR LIQUIDS

CROSS-REFERENCE TO RELATED APPLICATIONS

This application claims priority to U.S. Provisional Patent Application No. 63/018,385 titled "Systems and Method for Producing an Organic Fertilizer from Waste Gases or Liquids" filed Apr. 30, 2020, the entire disclosure of which is herein incorporated by reference in its entirety for all purposes.

FIELD OF THE TECHNOLOGY

Aspects and embodiments disclosed herein relate to systems and methods for recovering nitrogen from a gas stream or a liquid stream. In particular, systems and methods involve recovering nitrogen from gaseous emissions or liquid emissions to produce a fertilizer.

SUMMARY

In accordance with one aspect, a method is provided for extracting humic substances present in coal using a liquid and ammonia from a gaseous source or from said liquid and forming a fertilizer rich in humic substances and ammonia. Humic substances in the coal are chemically bound to metals rendering said humic substances inactive; ammonia reacts with said metals breaking the bond and solubilizing said humic substances and in the process stabilizing ammonia in the liquid making a fertilizer product.

In accordance with one aspect, there is provided a method of making an organic fertilizer rich in humics and ammonia comprising the steps:
  a) forming a coal-liquid stream by adding a coal such as but not limited to leonardite to a liquid, and
  b) contacting a gas stream containing ammonia with said coal-liquid stream, and
  c) absorbing ammonia into said coal-liquid stream, and
  d) allowing absorbed ammonia in the coal-liquid stream to react with the coal to form a coal-ammonia rich liquid, and
  e) collecting the coal-ammonia rich liquid as a fertilizer product.

In some embodiments, coal is pulverized the particle size is such that 50% or 60% or 75% or 90% of the material by weight passes a 140 mesh sieve; and yet in some cases only 10% or 20% or 40% of the material by weight passes a 140 mesh sieve.

In some embodiments, the pH of the coal-ammonia rich liquid is controlled between 4 and 9.

In some embodiments, the pH of the coal-ammonia rich liquid is controlled by adding more coal to said liquid.

In some embodiments, a liquid is added to the coal-liquid stream or to the coal-ammonia rich liquid to control the viscosity of the coal-ammonia rich liquid.

In some embodiments, the fertilizer product is further processed in a solid liquid separation step and forming two streams one containing mostly the liquid, the fertilizer liquid fraction, and a second one containing mostly solids, the fertilizer solid fraction.

In some embodiments, the liquid added is the fertilizer liquid fraction.

In some embodiments, the liquid used to form the coal-liquid stream is a high nitrogenous liquid waste.

In some embodiments, the fertilizer product is further processed to induce inactivation of pathogenic organisms present in said product by heat or radiation.

In accordance with another aspect, there is provided a method of making an organic fertilizer rich in humics and nitrogenous compounds comprising the steps:
  a) forming a coal-liquid stream by adding a coal such as but not limited to leonardite to a high nitrogenous liquid such as but not limited to urine, or ammonia distillate or aqua ammonia, and
  b) allowing the nitrogenous compounds in the coal-liquid stream to react to form a coal-ammonia rich fertilizer, and
  c) collecting the coal-ammonia rich fertilizer as a product.

In some embodiments, coal is pulverized the particle size is such that 50% or 60% or 75% or 90% of the material by weight passes a 140 mesh sieve; and yet in some cases only 10% or 20% or 40% of the material by weight passes a 140 mesh sieve.

In some embodiments, the pH of the coal-ammonia rich fertilizer is between 4 and 9.

In some embodiments, the pH of the coal-ammonia rich fertilizer is controlled by adding more coal to said coal ammonia rich fertilizer.

In some embodiments, the fertilizer product is further processed to induce inactivation of pathogenic organisms present in said product by heat or radiation.

In some embodiments, the fertilizer product is further processed in a solid liquid separation step and forming two streams one containing mostly the liquid and a second one containing mostly the solids from the coal.

In accordance with another aspect, there is provided an apparatus for making an organic fertilizer rich in humics and ammonia comprising a source of coal, and a source or liquid, and a chamber, such as but not limited to a pipe or a tank, fluidly connected to the source of liquid and the source of coal and where the liquid and the coal are mixed together to form a coal-liquid stream, and a pH controller for controlling pH of the coal-liquid stream, and a conduct such as but not limited to a pipe or an auger to remove the coal-liquid after mixing for a period of time in the chamber.

In some embodiments, the apparatus further comprises a source of gas containing ammonia fluidly connected to the chamber where the liquid and coal are mixed together, and a contactor to contact the gas and coal-liquid stream, and a conduct to remove the gas after contacting with the coal-liquid stream.

In some embodiments, a sterilizer device for inactivating pathogens present in the fertilizer are provided.

In some embodiments, a solids-liquid separation device to separate solids from liquids in the coal-liquid stream after removal from the chamber are provided, forming two streams, a solid reach stream and a liquid rich stream, and conducts to remove each of the streams as independent products.

BACKGROUND

Sustainable agriculture has been a growing field of interest in recent years due to increased concern regarding climate change and depletion of our planet's natural resources. Within the field of sustainable agriculture, one particular topic of concern is the significant reduction of Soil Organic Matter (SOM) that has occurred over the past century of industrialized agricultural practice.

Organic matter serves many purposes in healthy soil: it provides nutrients and habitat for a variety of macro- and micro-organisms vital to soil health, and also binds soil into aggregates, increasing water capacity and nutrient availability. Estimates show that traditional farming of corn, wheat, oats, barley and buckwheat accounts for a 1% loss of total SOM per year. Humic substances, also referred as humics, are formed in the process of organic matter decomposition in soils and account for a large fraction of SOM. Humics are comprised of fulvic acid, humic acid, and humin, and are responsible for the majority of the beneficial properties of SOM. It has been found that coal deposits, particularly lignite, oxidized lignite and leonardite, contain large amounts of humics, however said humics are bound to metal molecules and are therefore not in a form in which they can easily enter the soil and be reactive.

It has been a growing area of research to devise ways to activate the humic substances present in lignite and other similar coal byproducts, and combine them with other key nutrients, namely nitrogen, phosphorus and potassium, to create valuable soil amendments that aid in restoring soil health and providing nutrition for crops. Cost-effective methods for producing fertilizers containing nitrogen, phosphorus and humics have been devised by several parties as illustrated in U.S. Pat. Nos. 2,992,093, 3,418,100, 3,544,296, the methods generally involving adding phosphoric acid to ground leonardite to release the humic acids, ammoniating the mixture and creating a pelletized final product. Pelletized products containing ammonium humates have been developed; however, they are limited in use as fertilizer since the ammonia contained within is unstable and diminishes over time during storage. As the ammonia is lost, the humics convert to an insoluble form and nitrogen is no longer available for fertilizer use. More recently U.S. Pat. No. 6,695,892B1 describes a way of oxidizing lignite at high temperature in a aqueous ammoniacal liquid and drying the mixture to produce an organic fertilizer. The use of humic and fulvic acids extracted from coal materials using highly alkaline substances such as sodium hydroxide or potassium hydroxide have been proposed to treat waste gases. U.S. Pat. No. 9,011,577 B2 presents the use of highly alkalized extracted humic and fulvic acids to capture carbon dioxide, sulfur dioxide, nitrogen oxides, hydrogen sulfides, mercaptans and ammonia from a waste gas and production of a liquid and a solid fertilizer.

On the other hand waste gases and liquids containing nitrogenous compounds create a multitude of impacts on human health and the environment. Management of the nitrogen cycle has been identified by the National Academy of Engineers of the United States as one of the fourteen (14) Grand Challenges of Engineering in the 21$^{st}$ Century. The nitrogen cycle has been disrupted over the last century by human intervention with the synthesis of reactive nitrogen species for fertilizer production and the combustion of fossil fuels. Nitrogen plays an essential role in the production of food for humanity as it is usually the limiting nutrient for crop productivity; in fact, we could not feed the existing or future population of the world without producing ammonia from synthetic fertilizers. The methods used to meet our food challenges, however, have led to excess nitrogen in the planetary environment which has generated daunting impacts around the world. Excess nitrogen in the environment plays a role in disruption of ecosystems by the eutrophication of waters, e.g., Gulf of Mexico or Chesapeake Bay, exacerbation of global warming by production of potent greenhouse gases, acidification of lakes and soils, and contribution to the disruption of the ozone layer. Promotion of smog in densely populated areas and contamination of drinking water caused by excess environmental nitrogen have a direct impact on human health. The combined impacts of nitrogen cycle disruption for the United States are estimated at S210 billion a year.

Agriculture is responsible of over 50% of all reactive nitrogen inputs to the US. The Clean Water Act in the US has been very successful in controlling the pollution associated to point sources but its effectiveness to control non-point sources, in particular those associated with agriculture, has been questioned. Due to the gaseous nature of ammonia and its abundance in animal manures, the vast majority of ammonia is lost to the atmosphere or leached out to surface and groundwater during manure processing and land application. Recovery and stabilization of ammonia to produce fertilizers reduces inputs to the environment and offsets demands for synthetic nitrogen production.

Ammonia acts as a base when dissolved in water and raises the pH of the liquid to the point that free ammonia is released to the atmosphere. This is the main mechanism of ammonia losses from animal manures during storage and land application. Gaseous ammonia emissions such us but not limited to emissions from barns housing livestock or manure holding tanks, or manure composting operations or manure drying operations can be collected and treated with embodiments of the present invention to produce organic fertilizers. Ammonia emissions from manures on farms are also of great concern to the health and well-being of the farm animals, as ammonia is pungent and toxic. In order to maintain ammonia dissolved in water it is necessary to reduce the pH of the liquid by addition of an acid. Danish patent DK178419 B1 describes, for example, a mobile plant for manure slurry acidification to control ammonia emissions. Due to the high concentration of ammonia in liquid manure, and the expense and unintended effects of adding an acid, pH depression in manures is not frequently used. These problems are more pronounced in those liquid wastes that have high concentration of total nitrogen, measured as Total Kjeldahl Nitrogen, TKN, and referred to as high nitrogenous liquid waste in this invention. These high nitrogenous liquid wastes include liquids and slurries such as but not limited to animal manures, urine, liquid slaughterhouse waste, leachate from decomposing organic materials, waste activated sludge or primary sludge or resulting liquids from the treatment of such materials by an anaerobic digestion process. In the anaerobic digestion process, the organic nitrogen is mostly converted into ammonia in the digestate. This is the case for digestate of waste activated sludge or waste primary sludge in wastewater treatment plant anaerobic digesters, digestate from anaerobic digestion of animal manures or food waste or, in general, digestate of organic slurries or solid or slurry organic materials. In the case of manures, the high nitrogenous liquid waste can be formed by passing the manure through solid-liquid separation equipment, such as but not limited to, a filter or a centrifuge or a decanter. Two streams are formed—one that is enriched in solids and one that is mostly liquid and is said high nitrogenous liquid. Yet in the case of said anaerobic digestion digestate, said digestate is itself a high nitrogenous liquid, or can be further processed to remove solids in a solid-liquid separation step forming a polished high nitrogenous liquid. Yet in other cases ammonia present in high nitrogenous liquid can be stripped out of said liquid in the form of a gas and said gas can be treated with methods and systems described in the present invention. In some other cases the high nitrogenous liquid waste is distilled to produce ammonia distillates, or aqua ammonia or ammonia stillage and those liquids would also constitute a high nitrogenous liquid. All of these and similar high nitrogenous liquid, apparent to someone skilled in the art, can be stabilized with the methods and systems of the present invention in a practical and cost effective way. Environmental impacts and animal health improvements associated to uncontrolled ammonia emissions can be realized, and a valuable resource is recovered while forming a fertilizer that can be safely stored and accurately applied.

It is the purpose of this invention to provide a simple and cost-effective method of producing an organic fertilizer containing both humics and nitrogenous compounds which include but are not limited to ammonia from waste gases and liquids.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The subject matter of embodiments of the present invention is described with specificity herein to meet statutory requirements; however, the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Figure 1:
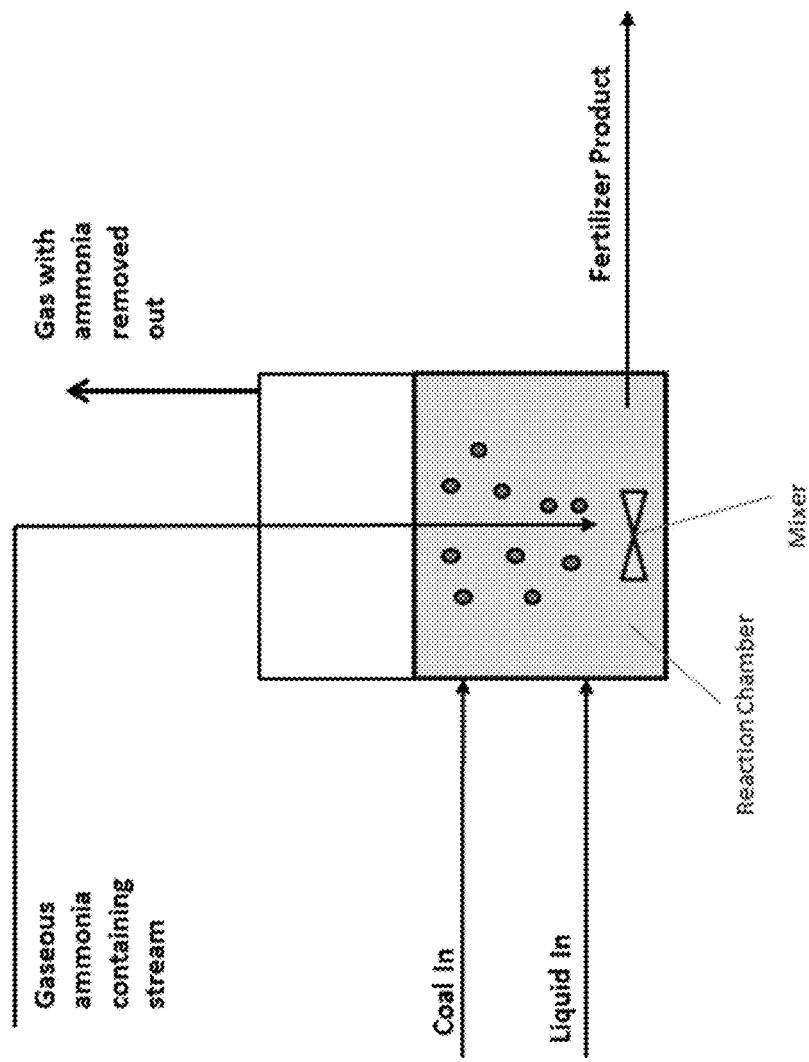
FIG. 1 is schematic diagram of an embodiment of the system for producing a fertilizer product rich in ammonia and humic substances.
Figure 2:
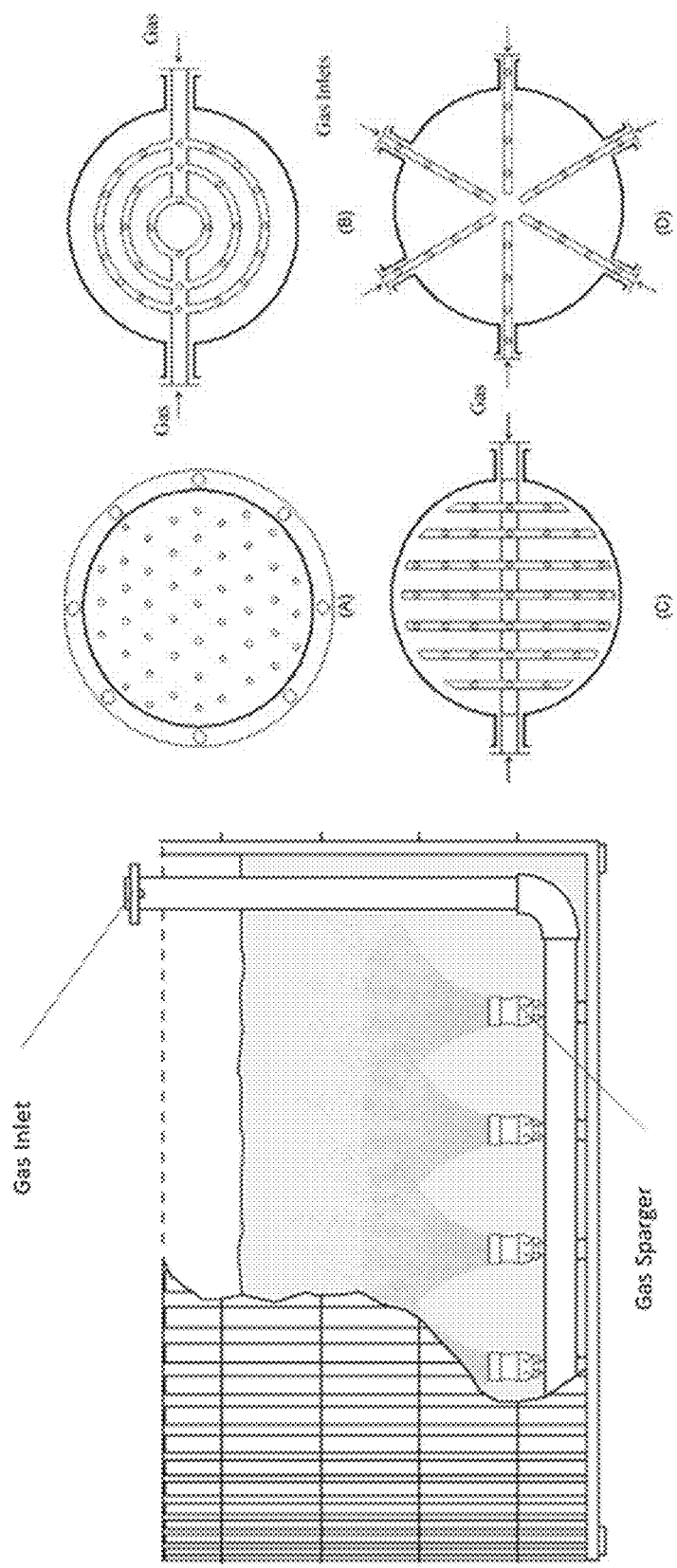
FIG. 2 is a schematic diagram of an absorption chamber, according to one embodiment.
Figure 3:
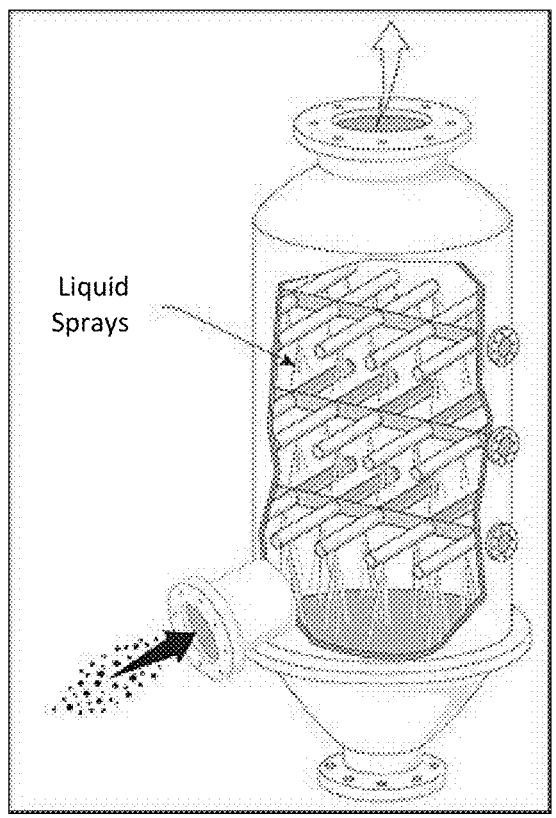
FIG. 3 is a schematic diagram of an alternative absorption chamber, according to one embodiment.

FIG. 1 illustrates a schematic view of the simplest possible embodiment of a continuous process for creating a coal-ammonia rich liquid fertilizer product from input streams containing coal, liquid, and ammonia gas respectively. Liquid and coal are pumped into the reaction chamber, where a mixer ensures all solids are evenly suspended throughout. In some embodiments the coal is lignite, yet in other embodiments the coal is oxidized lignite and yet in other embodiments said coal is leonardite. In some embodiments the coal has been ground to have a particle size that enhances dispersion in water. In some embodiments the particle size is such that 50% or 60% or 70% or 75% of the material by weight passes a 140-mesh sieve. Yet in some cases only 10% or 20% or 40% of the material by weight passes a 140-mesh sieve. In some embodiments the liquid is water but in some embodiments the liquid is a high nitrogenous liquid waste. The gaseous ammonia-containing stream is then passed through the resulting mixture in such a way that a fraction, between 10% and 99.9%, of the ammonia present in the gas stream, absorbs to said mixture and reacts with the humics present in the coal, creating a liquid fertilizer with high humic content and bound ammonia. In some embodiments the reaction chamber is a sparging chamber as illustrated in FIG. 2 where the gas is passed through submerged diffusers that make small bubbles that are in contact with the coal-liquid, and yet in another embodiment the reaction chamber is a scrubber as illustrated in FIG. 3 where the coal-liquid stream is sprayed into the gas stream to form small droplets of the coal-liquid solution in contact with the gas Ammonia in solution reacts with the metal humates in the coal replacing some of the calcium, iron and aluminum humates in the coal with ammonium ions. Some of the humics will dissolve in the water and complex with dissolved ammonium ions in water creating a mixture of stabilized ammonia partly bound to the solid fraction of the coal, partly complexed with the dissolved humics and partly ionized in solution. The humic substances in the coal are ampholytic substances creating a strong buffering effect that stabilizes the solution pH and enables the solution to receive extra ammonia from the gas. Finally, the resulting fertilizer product is removed from the chamber via a pipe or auger. In some embodiments the reaction can take place in a batch system and the chamber is filled with the coal and liquid solution and the gaseous stream is put in contact with the mixture until the pH of the solution increases to the point where no more ammonia is received, at which point the ammonia-rich liquid fertilizer product is removed from the chamber. In yet other embodiments the pH of the solution is controlled by adding coal into the chamber. The fresh coal added reacts with the ammonia present in the solution—binding, complexing and neutralizing—and maintaining the pH within a desired range. Absorption of ammonia from the gas eventually exhausts the reaction capacity of the coal and the solution pH will increase requiring further additions of fresh coal to bind, complex and extract humic substances from the coal. An undesirable effect of adding coal to the chamber is the increase in viscosity of the coal-liquid solution; in order to control the viscosity of the solution water is added into the chamber, and said water could include a high nitrogenous liquid waste.

Figure 4:
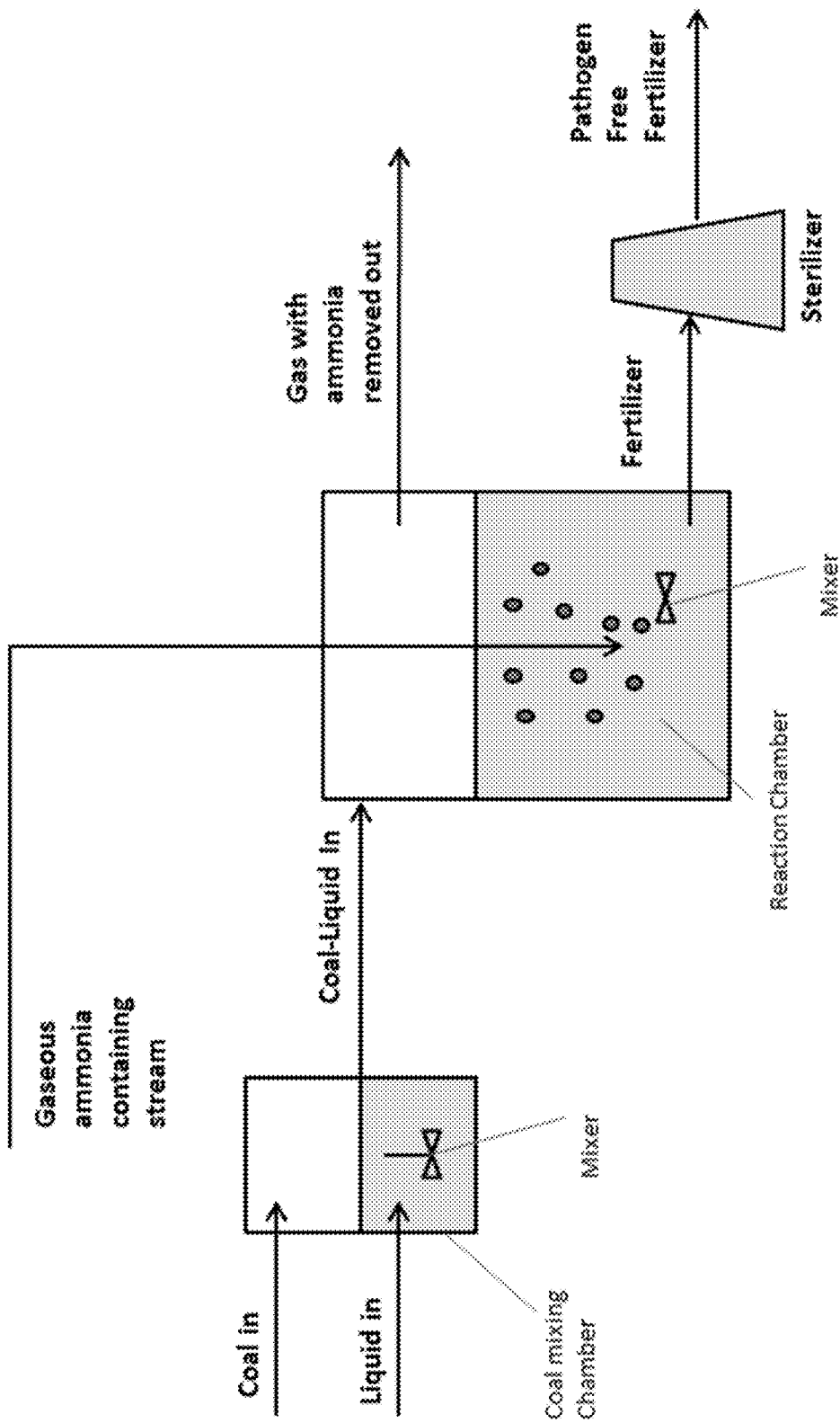
FIG. 4 is schematic diagram of an alternative embodiment of the system for producing a fertilizer product rich in ammonia and humic substances including a sterilizer for pathogen deactivation.

FIG. 4 illustrates yet another embodiment of the process described in FIG. 1, wherein the coal and liquid are conveyed into a mixing chamber, such as but not limited to a pipe or tank, to form a coal-liquid stream prior to being pumped into the reaction chamber. The mixture is combined with the gas stream to form the coal-ammonia-rich liquid fertilizer product. The flow rates of input and output streams are adjusted so as to achieve a desired nitrogen concentration and viscosity in the resultant fertilizer stream. It is possible in this embodiment to control the viscosity of the fertilizer product by independent adjustment of the amount of liquid, such as but not limited to water. Some degree of pH control is desirable since the ammonia present in the gas stream will raise the pH of the final product as it is incorporated into the mixture and ammonia is less stable at higher pH values. The pH of the liquid in the reaction chamber can be controlled by adjusting the flow rate of the coal stream. FIG. 4 also illustrates a sterilization step to process the fertilizer product after being removed from the reaction chamber; in said sterilization step pathogens are inactivated by the action of heat or radiation to render the fertilizer product free of pathogens.

Figure 5:
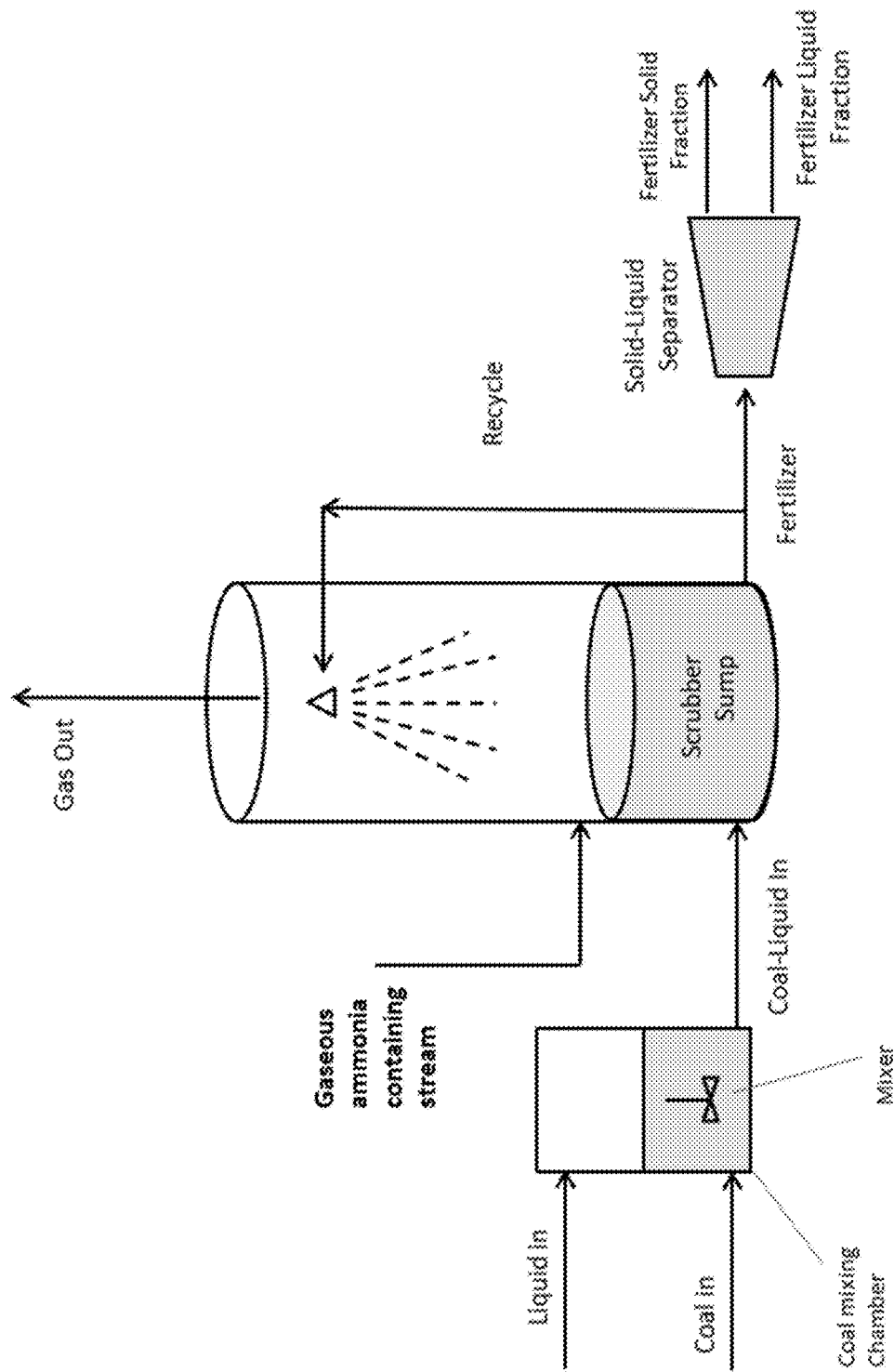
FIG. 5 is schematic diagram of an alternative embodiment of the system for producing a fertilizer product rich in ammonia and humic substances including a spray tower.

FIG. 5 illustrates yet another embodiment of the process described in FIG. 4, wherein the reaction chamber consists of a spray absorption tower, but it can also be a sparging chamber or a similar chamber where gas and liquid are brought into close contact and allowed to react. In some embodiments the gas contact chamber and reaction chamber might be separate vessels, for example. In this system, the gas enters at the bottom of the tower above the scrubber sump and flows upward, while being pumped continuously. The liquid is recycled from the scrubber sump and sprayed in a downward mist by a combination of spray nozzles such as but not limited to the arrangement in FIG. 3. FIG. 5 also illustrates the use of a solid-liquid separator after the fertilizer is withdrawn from the reaction vessel; the solid-liquid separator, such as but not limited to a clarifier or a hydrocyclone or screw-press or a decanter, separates the fertilizer product into two streams—one that is enriched in solids, namely the fertilizer solid fraction which mainly consists of reacted-ammoniated coal solids, and one that is mostly liquid, namely the fertilizer liquid fraction, which contains the coal extracted humics and complexed ammonia and other nitrogenous compounds absorbed from the gas. The pH of the fertilizer product in this case is controlled by adjusting the flow rates of the coal stream into the coal mixing chamber, while the viscosity of the fertilizer product is controlled by addition of liquid.

Figure 6:
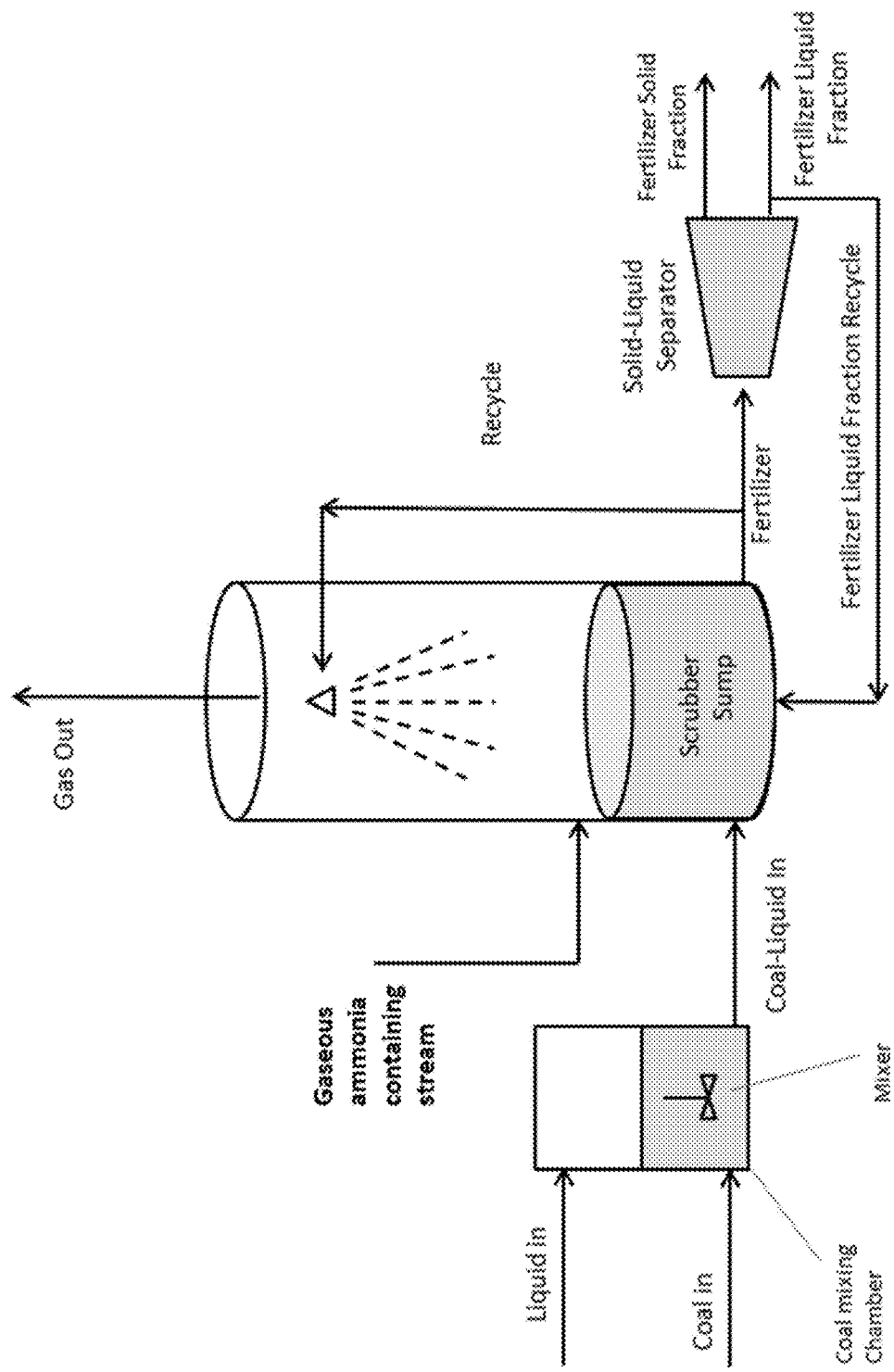
FIG. 6 is schematic diagram of an embodiment of the system for producing a fertilizer product rich in ammonia and humic substances including a spray tower and fertilizer liquid fraction recycle.

FIG. 6 presents yet another embodiment similar to FIG. 5 where the fertilizer liquid stream is recycled back to the reaction chamber and the ammoniated coal is removed as a fertilizer solid fraction. This arrangement further permits control of the pH and viscosity of the fertilizer product in the reaction chamber.

Figure 7:
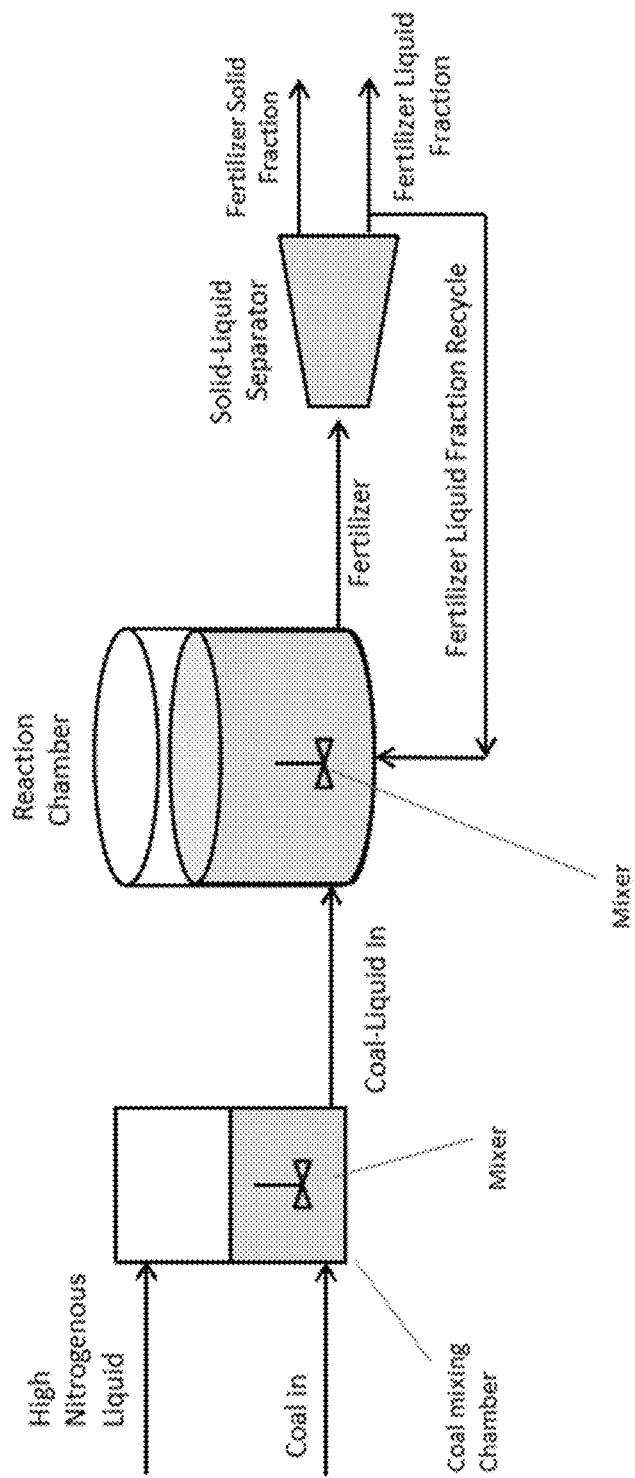
FIG. 7 is schematic diagram of an embodiment of the system for producing a fertilizer product rich in ammonia and humic substances using a high nitrogenous liquid.

FIG. 7 illustrates the use of the present invention to form a humic-rich fertilizer product from a high nitrogenous liquid waste. In some embodiments the high nitrogenous liquid waste is mixed with the coal in a mixing chamber and introduced into the reaction chamber. Yet in other embodiments, the high nitrogenous liquid waste and the coal are introduced directly to the reaction chamber where they are mixed to enhance contact and reaction by maintaining the coal in suspension. The nitrogenous contents of the liquid waste react with the humic salts in the coal in a similar way as previously described. Some of the humics are extracted from the coal and some of the ammonia is absorbed into the coal to make a humic-rich nitrogenous fertilizer with stabilized ammonia. In some embodiments the fertilizer withdrawn from the reaction chamber is passed through a solid-liquid separation process similar to previous embodiments, where two fractions are produced—a fertilizer solid fraction, with the majority of the coal and a fertilizer liquid fraction, with the majority of the stabilized liquid and extracted humic substances. Yet in some embodiments a portion, or all, of the fertilizer liquid fraction is recycled to the reaction chamber to further control the viscosity of the reaction chamber contents. The pH of the reaction chamber is controlled by regulating the addition of coal to said chamber, while the viscosity is controlled by the addition of water or the recycle of the fertilizer liquid fraction.

Example

Figure 8:
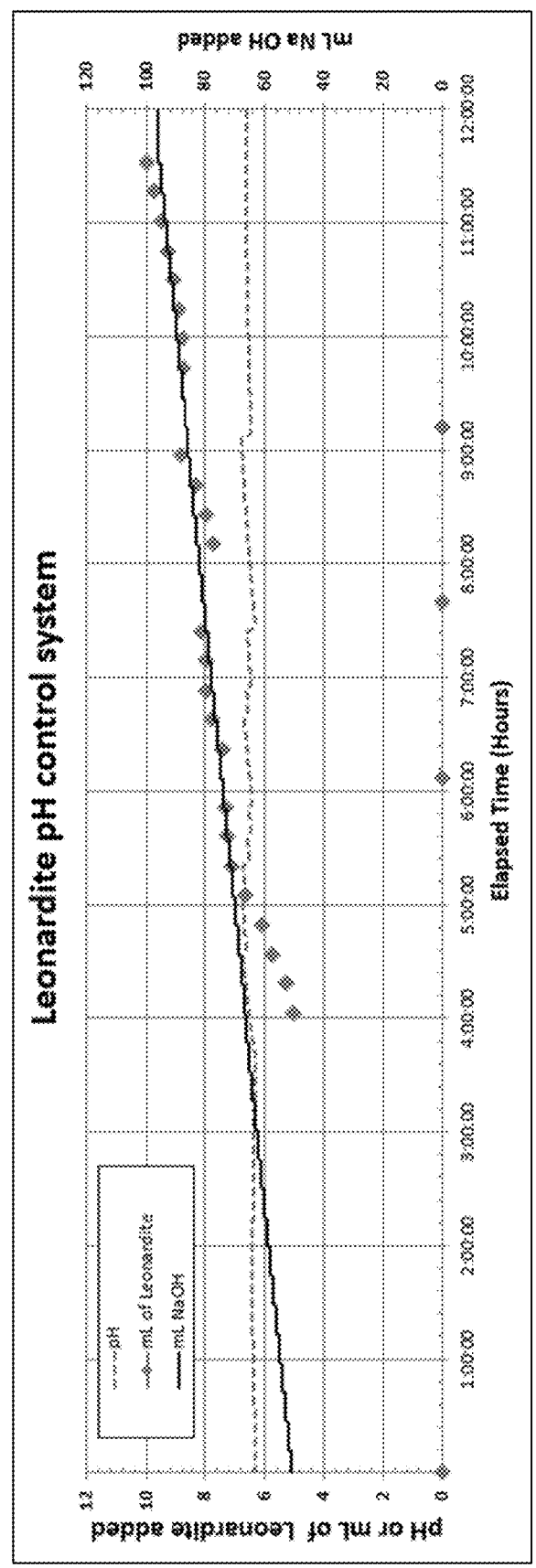
FIG. 8 is a graph of an exemplary system using leonardite to control pH as ammonia gas is absorbed to form a fertilizer rich in ammonia and humic substances.

An example of the results of laboratory tests conducted to optimize the pH control of the present invention is presented in FIG. 8. The system consisted of two 1000-mL Erlenmeyer flasks, Flasks 1 and 2, connected to each other via tubing and an air pump. The closed system was arranged so the air pump directed the gas from the head space of Flask 1 into the liquid in Flask 2 via an aeration stone, and the gas from the head space of Flask 2 through the liquid at the bottom of Flask 1 through a second, larger aeration stone. Both flasks were sealed, with a solenoid drip pump feeding 0.1 M NaOH solution into Flask 1 from a sealed reservoir, and a peristaltic pump feeding 50% leonardite solution from a second reservoir into Flask 2. Addition of NaOH strips ammonia out of the concentrated ammonium solution in Flask 1 and the circulating gas transports it into the solution of leonardite in Flask 2, with the amount of ammonia stripped being equivalent to the amount of NaOH added on a molar basis to Flask 1.

Flask 1 was prepared with 500 mL of 7.3% $NH_4Cl$ solution, and Flask 2 was prepared with a 40% leonardite solution. The pH of Flask 2 was measured with a pH probe connected to a control system which was also connected to the two reservoir pumps—one for NaOH and one for leonardite addition. The control system was designed so as to add NaOH in 1-mL increments every 5 minutes. When the pH in Flask 2 went above a set point, the control system would add leonardite from the reservoir to Flask 2 proportionally to keep the pH at the set point. FIG. 8 further illustrates that the pH of the leonardite containing flask increases as ammonia gas is transferred from the ammonia reservoir by the gas circulating between the two flasks, and that incremental additions of leonardite solution from an external reservoir are necessary to control said pH within a desired range.

The final fertilizer consisted of the contents of Flask 2. The ammonia gas released by the solution in Flask 1 passed through the solution in Flask 2, and combined with much of the humic content of the leonardite to form ammonium humate. The resulting fertilizer contained as much as 20,000 ppm of available nitrogen in the liquid, with additional nitrogen contained in the unreacted leonardite.

Aspects of the method disclosed herein are not limited in application to the details set forth in the previous description or illustrated in the drawings. Aspects of the method disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of making a fertilizer product, the method comprising:
   combining coal solids with a liquid to form a coal-liquid stream;
   mixing the coal-liquid stream to suspend the coal solids in the coal-liquid stream;

contacting a gas stream containing ammonia with the coal-liquid stream to absorb ammonia into the coal-liquid stream and form a coal-ammonia slurry; and collecting the coal-ammonia slurry as the fertilizer product.

2. The method of claim 1, further comprising separating the fertilizer product into a fertilizer solid fraction and a fertilizer liquid fraction.

3. The method of claim 2, further comprising recycling at least a portion of the fertilizer liquid fraction as the liquid.

4. The method of claim 1, comprising introducing the coal solids into a reactor and introducing the liquid into the reactor to form the coal-liquid stream.

5. The method of claim 1, comprising combining the coal solids and the liquid to form the coal-liquid stream and introducing the coal-liquid stream into the reactor.

6. The method of claim 1, wherein the gas stream comprises a waste gas selected from the group consisting of barn emissions, manure holding tank emissions, manure composting emissions, manure drying emissions, and combinations thereof, or a stripped gas from a waste composition selected from the group consisting of animal manure, urine, slaughterhouse waste, decomposing organic material leachate, waste activated sludge, primary sludge, anaerobic digestion liquids, and combinations thereof, or a stripped gas from a liquid stream of the waste composition.

7. The method of claim 1, wherein contacting the gas stream with the coal-liquid stream comprises introducing the gas stream into a sparging chamber through a submerged diffuser or introducing the coal-liquid into a scrubber through a spray head.

8. The method of claim 1, wherein the coal solids are selected from the group consisting of lignite, oxidized lignite, leonardite, and combinations thereof.

9. The method of claim 1, wherein the coal solids are in the form of ground particles and 50%-75% of the ground particles pass a 140-mesh sieve.

10. The method of claim 1, further comprising sterilizing the fertilizer product by heat or radiation.

11. A method of making a fertilizer product, the method comprising:

introducing coal solids comprising metal humates into a reactor;

introducing a nitrogenous liquid comprising ammonia into the reactor to form a coal-liquid stream;

mixing the coal-liquid stream to suspend the coal solids in the coal-liquid stream;

controlling a rate of introducing the coal solids into the reactor to control pH of the coal-liquid stream and stabilize the ammonia forming a coal-ammonia slurry; and collecting the coal-ammonia slurry as the fertilizer product.

12. The method of claim 11, further comprising separating the fertilizer product into a fertilizer solid fraction and a fertilizer liquid fraction.

13. The method of claim 12, further comprising recycling at least a portion of the fertilizer liquid fraction as the nitrogenous liquid.

14. The method of claim 11, wherein the nitrogenous liquid is selected from the group consisting of urine, ammonia distillate, aqua ammonia, and combinations thereof.

15. The method of claim 11, wherein the nitrogenous liquid comprises a waste liquid stream selected from the group consisting of animal manure, urine, slaughterhouse waste, decomposing organic material leachate, waste activated sludge, primary sludge, anaerobic digestion liquids, and combinations thereof.

16. The method of claim 11, comprising controlling a rate of introducing the nitrogenous liquid into the reactor to control nitrogen concentration and viscosity of the coal-liquid stream.

17. The method of claim 11, further comprising measuring the pH of the coal-liquid stream and introducing the coal solids into the reactor proportionately with a measured increase in pH.

18. The method of claim 11, wherein the coal solids are selected from the group consisting of lignite, oxidized lignite, leonardite, and combinations thereof.

19. The method of claim 11, wherein the coal solids are in the form of ground particles and 50%-75% of the ground particles pass a 140-mesh sieve.

20. The method of claim 11, further comprising sterilizing the fertilizer product by heat or radiation.

* * * * *